United States Patent
Yagyu et al.

(10) Patent No.: US 10,582,657 B2
(45) Date of Patent: Mar. 10, 2020

(54) SPREADING DEVICE

(71) Applicant: Kubota Corporation, Osaka-shi (JP)

(72) Inventors: Sumio Yagyu, Sakai (JP); Takao Nakagawa, Sakai (JP); Masaru Kawane, Sakai (JP)

(73) Assignee: KUBOTA CORPORATION, Osaka-Shi (JP)

(*) Notice: Subject to any disclaimer, the term of this patent is extended or adjusted under 35 U.S.C. 154(b) by 0 days.

(21) Appl. No.: 15/992,183

(22) Filed: May 30, 2018

(65) Prior Publication Data
US 2019/0000012 A1  Jan. 3, 2019

(30) Foreign Application Priority Data

Jun. 28, 2017 (JP) ................. 2017-126725

(51) Int. Cl.
*A01C 19/02* (2006.01)
*A01C 23/00* (2006.01)
(Continued)

(52) U.S. Cl.
CPC .......... *A01C 23/008* (2013.01); *A01C 17/005* (2013.01); *A01C 19/02* (2013.01);
(Continued)

(58) Field of Classification Search
CPC ..... A01C 23/008; A01C 19/02; A01C 23/003; A01C 17/005; F16H 3/725
See application file for complete search history.

(56) References Cited

U.S. PATENT DOCUMENTS 9,366,297 B2 * 6/2016 Hause ............... F16D 11/00
10,076,074 B2 * 9/2018 Case ............... A01C 19/00
(Continued)

FOREIGN PATENT DOCUMENTS

DE  102009025743  11/2010
EP  1825739  8/2007
(Continued)

OTHER PUBLICATIONS

Extended European Search Report for corresponding EP Application No. 18180205.9-1011, dated Nov. 9, 2018.
(Continued)

*Primary Examiner* — Patrick H Mackey
(74) *Attorney, Agent, or Firm* — Mori & Ward, LLP

(57) ABSTRACT

A spreading device includes a containing unit to contain a spread material, a first spreading unit including a first rotating body to spread the spread material contained in the containing unit, a second spreading unit including a second rotating body to spread the spread material contained in the containing unit, a first driving source of which speed is changeable, a first shaft to transmit power provided from the first driving source, a second shaft to transmit power provided from a second driving source different from the first driving source, and a power transmission mechanism to receive power from the first shaft and power from the second shaft, the power transmission mechanism being capable of transmitting the power received from the first shaft and the power received from the second shaft to the first rotating body and the second rotating body.

12 Claims, 9 Drawing Sheets

(51) Int. Cl.
*A01C 17/00* (2006.01)
*F16H 3/72* (2006.01)

(52) U.S. Cl.
CPC .......... *A01C 23/003* (2013.01); *F16H 3/725* (2013.01); *F16H 2200/2005* (2013.01); *F16H 2200/2007* (2013.01); *F16H 2200/2033* (2013.01)

(56) References Cited

U.S. PATENT DOCUMENTS

2005/0257725 A1   11/2005  Landphair et al.
2015/0020625 A1*  1/2015  Hause .................... A01C 7/046
                                                       74/405

FOREIGN PATENT DOCUMENTS

| EP | 1825739 A1 * | 8/2007 | ........... A01C 17/005 |
|---|---|---|---|
| JP | 59-106211 | 6/1984 | |
| JP | 2007312705 A * | 12/2007 | |
| JP | 2011-045387 | 3/2011 | |
| JP | 2013-243982 | 12/2013 | |
| JP | 2014-093976 | 5/2014 | |
| JP | 2014093976 A * | 5/2014 | |
| WO | WO-2019003711 A1 * | 1/2019 | |

OTHER PUBLICATIONS

Japanese Office Action for corresponding JP Application No. 2017-126725, dated Jul. 25, 2017 (w/ machine translation).

* cited by examiner

FIG. 7

| | A | | | B | | |
|---|---|---|---|---|---|---|
| M1 | 972 | 0 | −472 | 972 | 0 | −472 |
| A1 | −2915 | 0 | 1415 | −2915 | 0 | 1415 |
| S1 | 1000 | 1000 | 1000 | 1000 | 1000 | 1000 |
| C1 | 2958 | 1500 | 793 | 2958 | 1500 | 793 |
| M2 | 1479 | 750 | 396 | −201 | −102 | −54 |
| C2 | −1479 | −750 | −396 | 201 | 102 | 54 |
| A2 | 2598 | 1500 | 793 | 2958 | 1500 | 793 |
| S2 | 0 | 0 | 0 | 1120 | 568 | 300 |
| B1 | 0 | 0 | 0 | 1120 | 568 | 300 |
| B2 | −1120 | −568 | −300 | −1120 | −568 | −300 |

FIG. 8

|    | C    |       | D    |       |
|----|------|-------|------|-------|
| M1 | 972  | -472  | 0    | -472  |
| A1 | -2915| 1415  | 0    | 1415  |
| S1 | 1000 | 1000  | 1000 | 1000  |
| C1 | 2958 | 793   | 1500 | 793   |
| M2 | 1029 | -1284 | -102 | -54   |
| C2 | -1029| 1284  | 102  | 54    |
| A2 | 2598 | 793   | 1500 | 793   |
| S2 | 300  | 1120  | 568  | 300   |
| B1 | 300  | 1120  | 568  | 300   |
| B2 | -1120| -300  | 0    | 0     |

SPREADING DEVICE

CROSS-REFERENCE TO RELATED APPLICATIONS

The present application claims priority under 35 U.S.C. § 119 to Japanese Patent Application No. 2017-126725, filed Jun. 28, 2017. The contents of this application are incorporated herein by reference in their entirety.

BACKGROUND OF THE INVENTION

Field of the Invention

The present invention relates to a spreading device to spread a spread material such as a fertilizer over a field or the like.

Discussion of the Background

Conventionally, a spreading device disclosed in JP S59-106211 A is known.

The spreading device disclosed in JP S59-106211 A includes a containing unit (tank) which is provided in the rear of a traveling vehicle (tractor) and contains a spread material such as a fertilizer, and two rotating bodies (horizontally-rotating scattering boards) which spread the spread material contained in the containing unit. The two rotating bodies are driven by power taken out from a PTO shaft provided in the traveling vehicle.

SUMMARY OF THE INVENTION

A spreading device according to one aspect of the present invention includes: a containing unit to contain a spread material; a first spreading unit including a first rotating body to spread the spread material contained in the containing unit; a second spreading unit including a second rotating body to spread the spread material contained in the containing unit; a first driving source of which speed is changeable; a first shaft to transmit power provided from the first driving source; a second shaft to transmit power provided from a second driving source different from the first driving source; and a power transmission mechanism to receive power from the first shaft and power from the second shaft, the power transmission mechanism being capable of transmitting the power received from the first shaft and the power received from the second shaft, to the first rotating body and the second rotating body.

A spreading device according to another aspect of the present invention includes: a containing unit to contain a spread material; a first spreading unit including a first rotating body to spread the spread material contained in the containing unit; a second spreading unit including a second rotating body to spread the spread material contained in the containing unit; a first power transmission unit to transmit power to the first rotating body; and a second power transmission unit to transmit power to the second rotating body. The first power transmission unit or the second power transmission unit includes a speed changing unit including a driving source capable of changing a rotational speed of the first rotating body or the second rotating body by causing rotary power to act on a path through which power is transmitted to the first rotating body or the second rotating body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a table showing certain examples of an operation pattern of the driving unit.

FIG. 8 is a table showing other examples of an operation pattern of the driving unit.

DESCRIPTION OF THE EMBODIMENTS

Figure 1:
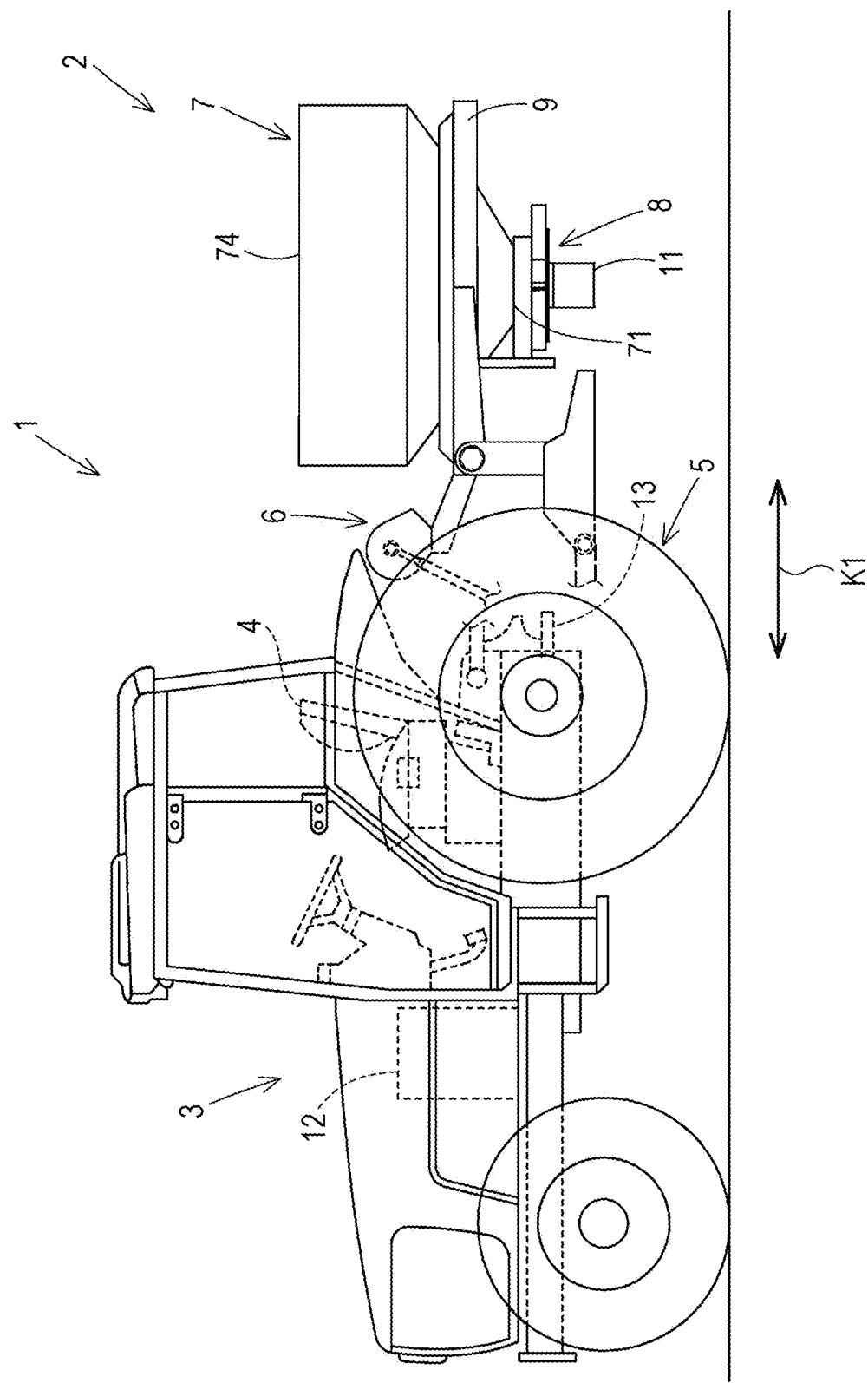
FIG. 1 is a side view of a spreading machine.

The embodiments will now be described with reference to the accompanying drawings, wherein like reference numerals designate corresponding or identical elements throughout the various drawings.

Hereinafter, embodiments of the present invention will be described with reference to the drawings.

Figure 2:
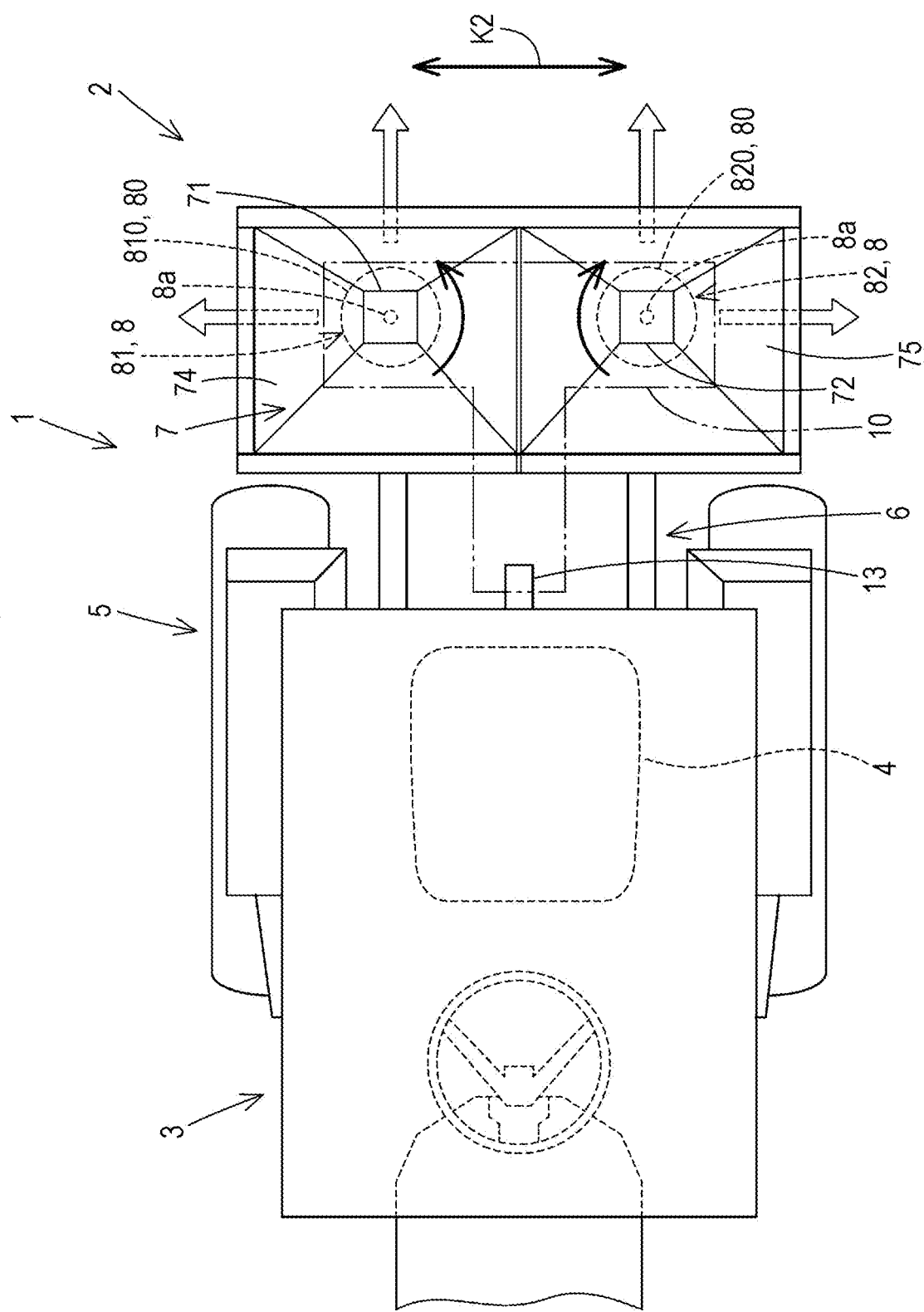
FIG. 2 is a plan view of the spreading machine.

FIGS. 1 and 2 show a spreading machine 1 including a spreading device 2 according to one embodiment of the present invention. The spreading machine 1 includes the spreading device 2 and a traveling vehicle 3.

The spreading device 2 spreads a spread material such as a fertilizer or a medicine over a field (farm). The traveling vehicle 3 is a vehicle which travels while towing the spreading device 2. Although a kind of the traveling vehicle 3 is not limited to any specific kind, the traveling vehicle 3 is a tractor in the present embodiment. Further, the spreading device 2 may be a device traveling independently without being towed by the traveling vehicle 3.

The tractor (traveling vehicle) 3 includes a driver's seat 4, a travel device 5, and a linking device 6. In the embodiments of the present invention, description will be made assuming that a front side of a driver who is seated on the driver's seat 4 (a left side in FIG. 1) is in a forward direction, a rear side of a driver (a right side in FIG. 1) is in a rearward direction, a left side of a driver (a side closer to a viewer of FIG. 1) is in a leftward direction, and a right side of a driver (a side farther from a viewer of FIG. 1) is in a rightward direction. Also, description will be made assuming that a horizontal direction K2 (refer to FIG. 2) which is orthogonal to a longitudinal direction K1 (refer to FIG. 1) is a vehicle widthwise direction.

Further, the tractor 3 includes an internal combustion engine 12 and a PTO shaft 13 through which rotary power provided from the internal combustion engine 12 is output. In the present embodiment, the internal combustion engine 12 is an engine, and is preferably a diesel engine.

A rotational speed of the PTO shaft 13 may be either constant, or changeable in plurality of levels (two or three levels, or more). It is noted that a term "rotational speed" is the number of rotations (revolutions) per unit time, and is also referred to as "the number of rotations (revolutions)". A rotational speed is represented by a unit "rpm", for example.

Although the travel device 5 is of a four-wheel-drive type including a front wheel and a rear wheel in the present embodiment, the travel device 5 may alternatively be of a crawler type.

The linking device 6 is provided in a rear portion of the tractor 3. The linking device 6 includes a three-point linking mechanism and the like. The linking device 6 is removably linked with the spreading device 2.

Hereinafter, the spreading device 2 will be described.

As shown in FIGS. 1 to 4, the spreading device 2 includes a containing unit 7 and a spreading unit 8.

The containing unit 7 contains a spread material which is to be spread over a field.

As shown in FIGS. 1 to 4, the containing unit 7 includes a hopper having an approximately inverted pyramid shape.

The containing unit 7 includes a charging port for a spread material in an upper end thereof, and includes a discharging port from which a spread material contained therein is taken out, in a lower end thereof. In the present embodiment, the number of discharging ports is equal to the number of rotating bodies 80 which will be later described. More specifically, since the number of the rotating bodies 80 is two, also the number of discharging ports is two. In the following description, the two discharging ports will be referred to as a "first discharging port 71" and a "second discharging port 72", respectively, for convenience's sake. However, the number of discharging ports may be different from the number of the rotating bodies 80, and for example, a single discharging port may be provided for a plurality of rotating bodies 80. In such a case, a spread material taken out from the single discharging port is supplied while being divided among the plurality of rotating bodies 80.

The hopper forming the containing unit 7 may include either a single hopper having a plurality of discharging ports (a single charging port and a plurality of discharging ports), or a plurality of hoppers having discharging ports, respectively (a plurality of charging ports and a plurality of discharging ports). The hopper may alternatively include a plurality of hoppers having a single discharging port (a plurality of charging ports and a single discharging port).

For example, in a case where the number of discharging ports is two, there may be provided either a single hopper having two discharging ports, or two hoppers each having a single discharging port. Also, in a case where the number of discharging ports is one, there may be provided a single discharging port used by two hoppers in common, for example.

In the present embodiment, two hoppers each having a discharging port (two charging ports and two discharging ports) are used for the containing unit 7. That is, the containing unit 7 includes a first hopper 74 having the first discharging port 71 and a second hopper 75 having the second discharging port 72. As a result of this, it is possible to have the first hopper 74 and the second hopper 75 contain different spread materials, respectively, so that the different spread materials can be taken out from the respective discharging ports (the first discharging port 71 and the second discharging port 72) and be spread.

Figure 3:
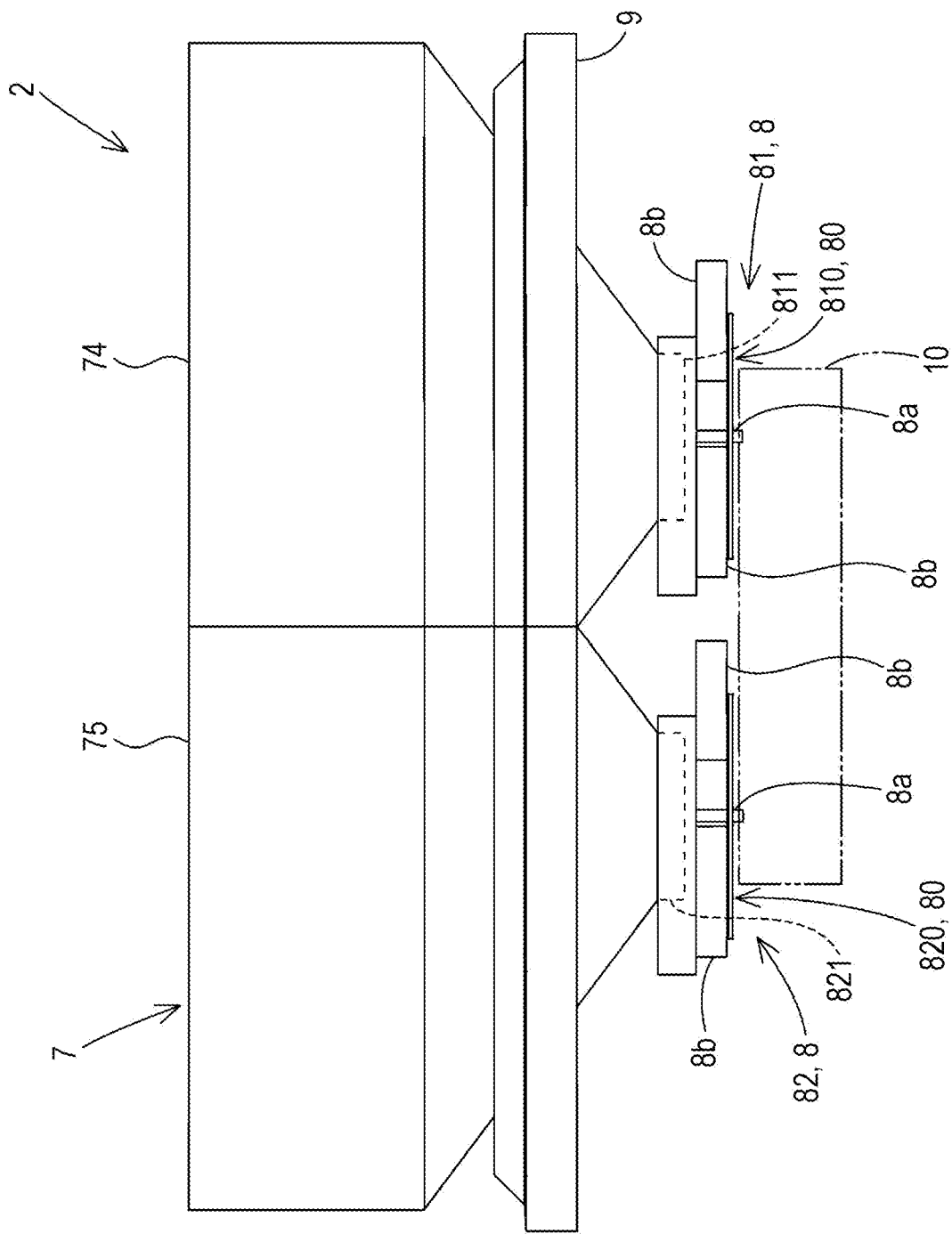
FIG. 3 is a rear view of a spreading device.

The spreading unit 8 spreads a spread material contained in the containing unit 7. As shown in FIGS. 1, 3, and the like, the spreading unit 8 is provided below the containing unit 7.

The spreading unit 8 includes at least two spreading units which spread materials in different directions.

Figure 4:
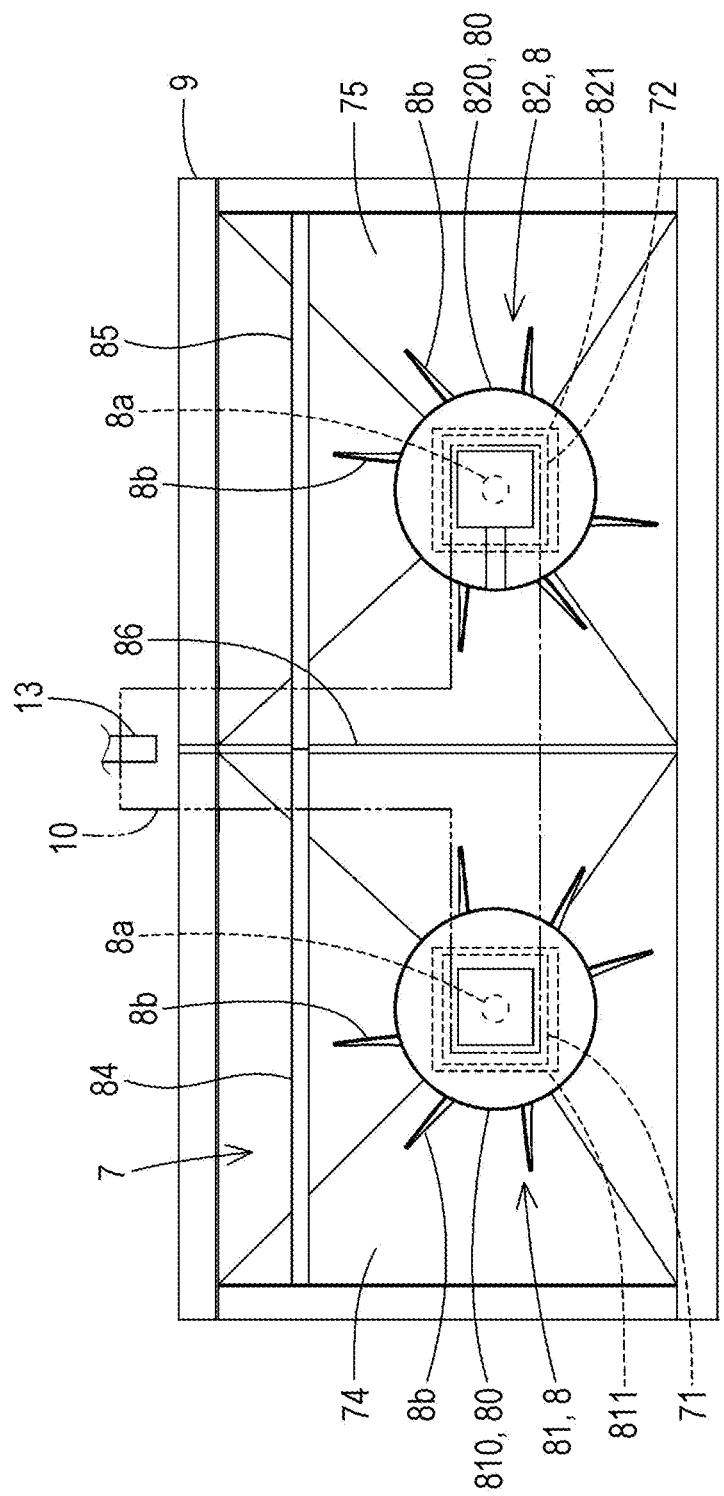
FIG. 4 is a bottom view of the spreading device.

As shown in FIGS. 2 and 4, in the present embodiment, the spreading unit 8 includes a first spreading unit 81 and a second spreading unit 82. That is, in the present embodiment, the number of the spreading units 8 is two. However, the number of the spreading units 8 is not limited to two, and may be three or more. The number of the spreading units 8 and the number of the rotating bodies 80 are equal to each other.

As shown in FIGS. 2 and 4, the first spreading unit 81 and the second spreading unit 82 are provided side by side along a width of the traveling vehicle 3 (along a vehicle widthwise direction). Hereinafter, the two spreading units (the first spreading unit 81 and the second spreading unit 82) will be described.

As shown in FIGS. 3 and 4, the first spreading unit 81 includes a first rotating body 810 and a first shutter device 811.

The first rotating body 810 has a disk shape, and rotates about a center axis 8a extending along a vertical direction (upward and downward directions). A plurality of blade members 8b are attached to an upper surface of the first rotating body 810. The plurality of blade members 8b are circumferentially placed at some intervals, and extend from a neighborhood of the center axis 8a in a radially-outward direction. The first rotating body 810 rotates about the center axis 8a, to cause a spread material dropping from the first discharging port 71 to hit against the blade members 8b so that the spread material is radially scattered outward (in a radially-outward direction).

The first shutter device 811 includes a shutter and an electric motor (not shown). The shutter is attached to the first discharging port 71 of the containing unit 7, and moving of the shutter can change an area (an opening degree) of the first discharging port 71. The electric motor is a stepping motor or the like, and is linked with the shutter. The first shutter device 811, being driven by the electric motor, moves the shutter, to thereby change an opening degree of the first discharging port 71. As a result of this, an amount of a spread material being spread by the first spreading unit 81 is adjusted.

As shown in FIG. 4, the second spreading unit 82 includes a second rotating body 820 and a second shutter device 821. A configuration of the second rotating body 820 is analogous to that of the first rotating body 810, and therefore, description thereof is omitted.

A configuration of the second shutter device 821 is the same as that of the first shutter device except that a shutter is attached to the second discharging port 72. The second shutter device 821 adjusts an amount of a spread material being spread by the second spreading unit 82 by changing an opening degree of the second discharging port 72.

As shown in FIGS. 2 and 4, the first rotating body 810 and the second rotating body 820 are provided side by side along a width of the traveling vehicle 3 (along a vehicle widthwise direction). In other words, the first rotating body 810 and the second rotating body 820 are placed in the same position along a longitudinal direction and are placed in different positions along a vehicle widthwise direction.

As shown in FIG. 2, the first rotating body 810 and the second rotating body 820 rotate in directions different from each other. In the present embodiment, as shown by a black arrow in FIG. 2, the first rotating body 810 rotates counter-clockwise and the second rotating body 820 rotates clockwise in plan view.

The first rotating body 810 is placed below the first discharging port 71 of the containing unit 7. A spread material dropping from the first discharging port 71 is spread by the first rotating body 810 which is rotating. The second rotating body 820 is placed below the second discharging port 72 of the containing unit 7. A spread material dropping from the second discharging port 72 is spread by the second rotating body 820 which is rotating.

The first spreading unit 81 and the second spreading unit 82 spread materials in different directions. The first spreading unit 81 spreads a material in one of directions along a vehicle width and rearward. The second spreading unit 82 spread a material in the other of directions along a vehicle width and rearward. As shown by outlined arrows in FIG. 2, in the present embodiment, the first spreading unit 81 spreads a material rightward and toward the rear on the right side, and the second spreading unit 82 spreads a material leftward and toward the rear on the left side. It is noted that directions shown by the outlined arrows are major directions for spreading, and actually, a material is spread, taking a sector shape including the directions shown by the outlined arrows.

As shown in FIG. 4, the spreading unit 8 includes a restriction board which restricts respective spreading directions of the first spreading unit 81 and the second spreading unit 82. The restriction board includes a first restriction board 84, a second restriction board 85, and a third restriction board 86. Each of the restriction boards can be attached to a frame 9 later described, or the like.

The first restriction board 84 is provided in front of the first rotating body 810, and extends along a vehicle widthwise direction. The first restriction board 84 restricts (prevents) spreading of a spread material in a forward direction due to rotation of the first rotating body 810. The second restriction board 85 is provided in front of the second rotating body 820, and extends along a vehicle widthwise direction. The second restriction board 85 restricts spreading of a spread material in a forward direction due to rotation of the second rotating body 820. The third restriction board 86 is provided between the first rotating body 810 and the second rotating body 820, and extends along a longitudinal direction. The third restriction board 86 restricts spreading of a spread material in a leftward direction due to rotation of the first rotating body 810, and spreading of a spread material in a rightward direction due to rotation of the second rotating body 820.

Thus, a direction in which a material is to be spread due to rotation of the first rotating body 810 is restricted by the first restriction board 84 and the third restriction board 86, so that a material is spread mainly rightward and toward the rear on the right side. A direction in which a material is to be spread due to rotation of the second rotating body 820 is restricted by the second restriction board 85 and the third restriction board 86, so that a material is spread mainly leftward and toward the rear on the left side.

It is noted that the restriction board may have any configuration (a position, the number, a shape, a structure for attachment, or the like) that can restrict a spreading direction of each of the first spreading unit 81 and the second spreading unit 82 to a desired direction, and a configuration thereof is not limited to that shown in FIG. 4.

As described above, the first spreading unit 81 and the second spreading unit 82 are responsible for spreading in different directions, respectively. This makes it possible to easily achieve uniform spreading over a field. Also, by making rotational speeds of the first rotating body 810 and the second rotating body 820 different from each other, it is possible to make a spreading distance in one of directions along a vehicle width of the tractor 3 different from a spreading distance in the other direction. This makes it easy to appropriately spread a material in accordance with a shape of a field or a position where the tractor 3 is traveling.

As shown in FIGS. 1, 3, and 4, the spreading device 2 includes the frame (mounting unit) 9. As shown in FIG. 1, the frame 9 supports the containing unit 7, the spreading unit 8, and a first driving source 11.

As shown in FIGS. 3 and 4, the frame 9 is attached to a periphery of the hopper forming the containing unit 7. More particularly, the frame 9 is attached so as to surround the first hopper 74 and the second hopper 75. As a result of this, the hopper forming the containing unit 7 is supported by the frame 9.

A supporting member (not shown) is attached to a lower portion of the frame 9, and a driving unit 10 including the first driving source 11, the spreading unit 8, and the like are supported by the supporting member below the containing unit 7.

As shown in FIGS. 1 and 2, a front portion of the frame 9 is linked with the linking device 6 provided in a rear portion of the tractor 3. As a result of this, the spreading device 2 supported by the frame 9 is removably mounted onto a rear portion of the tractor 3.

It is noted that a configuration (such as a shape) of the frame 9 is not limited to the configuration shown in FIGS. 3 and 4, and the frame 9 may have any configuration that can support the containing unit 7 and the spreading unit 8 and can be linked with the linking device 6.

As shown in FIGS. 2 to 4, the spreading device 2 includes the driving unit 10.

The driving unit 10 can be supported by the frame 9, for example.

Hereinafter, two embodiments (first embodiment and second embodiment) of the driving unit 10 will be sequentially described.

First Embodiment of Driving Unit

First, with reference to FIG. 5, a first embodiment of the driving unit 10 will be described.

Figure 5:
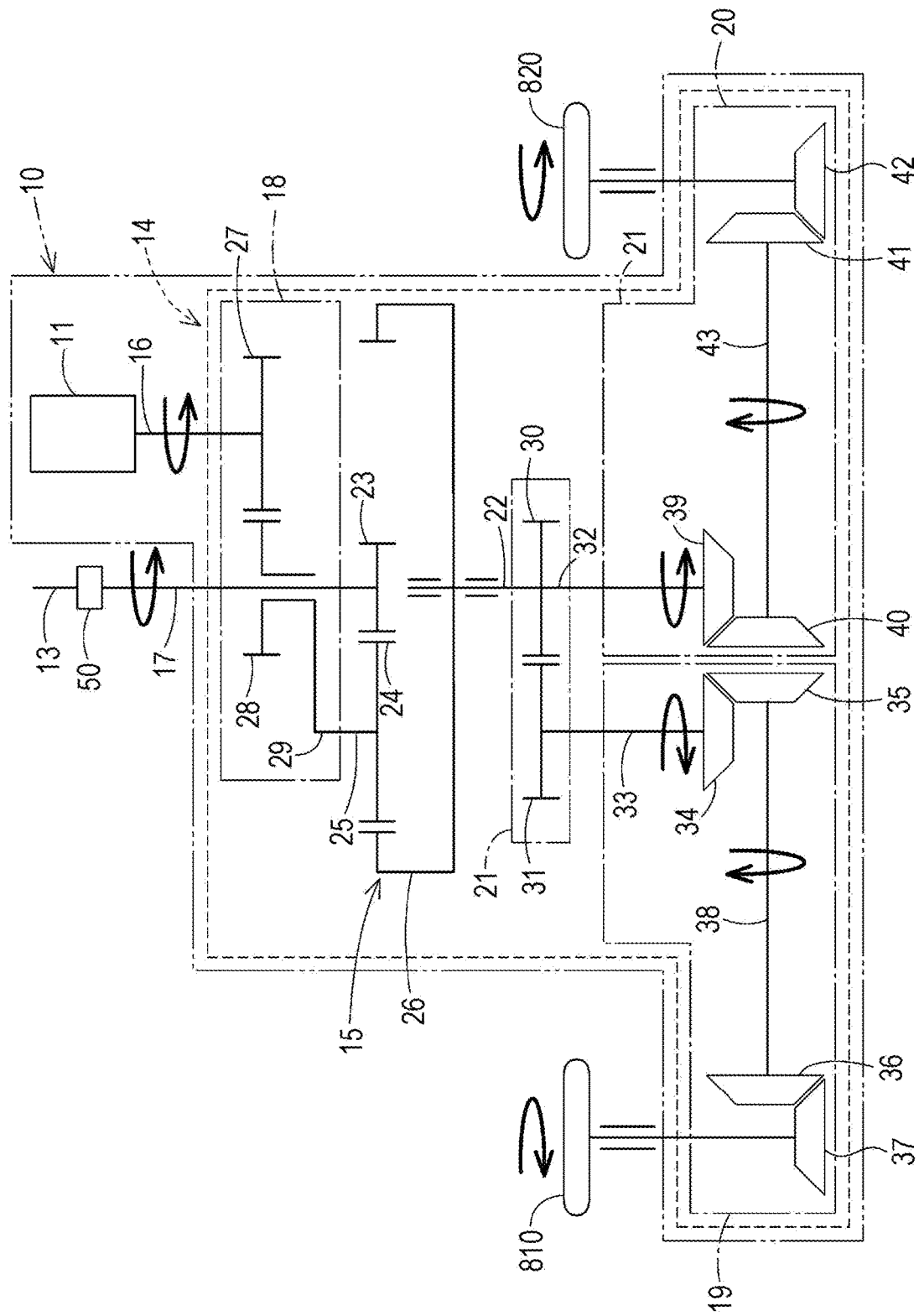
FIG. 5 is a view showing a first embodiment of a driving unit.

As shown in FIG. 5, the driving unit 10 includes a first driving source 11 and a power transmission mechanism 14.

The first driving source 11 is a driving source of which speed is changeable. More specifically, the first driving source 11 is a motor. In the present embodiment, the first driving source 11 is an electric motor.

The first driving source 11 is a driving source which drives a rotating body (a first rotating body 810 and a second rotating body 820) of a spreading unit 8. On the other hand, also an internal combustion engine (which will hereinafter be referred to as a "second driving source") 12 provided in the tractor 3 is a driving source which drives a rotating body (the first rotating body 810 and the second rotating body 820) of the spreading unit 8. That is, both of the first driving source 11 and the second driving source 12 can drive the first rotating body 810 and the second rotating body 820. A relationship between a drive of a rotating body (the first rotating body 810 and the second rotating body 820) and a driving source (the first driving source 11 and the second driving source 12) used for the drive will be later described in detail.

The power transmission mechanism 14 is a mechanism to transmit power of the first driving source 11 and power of the second driving source 12 to the first rotating body 810 and the second rotating body 820. More particularly, the power transmission mechanism 14 transmits power of the first driving source 11 to the first rotating body 810 and the second rotating body 820, and transmits power of the second driving source 12 to the first rotating body 810 and the second rotating body 820.

As shown in FIG. 5, the power transmission mechanism 14 includes a planetary gear mechanism 15.

The planetary gear mechanism 15 includes a sun gear 23, a planet gear 24, a planet carrier 25, and an internal gear 26.

The sun gear 23 is engaged with the planet gear 24. The planet gear 24 is rotatably supported by the planet carrier 25, and can turn (revolve) around the sun gear 23. The planet carrier 25 rotates along with turning (revolution) of the planet gear 24. The internal gear 26 is engaged with the planet gear 24.

As shown in FIG. 5, the power transmission mechanism 14 includes an input transmission unit 18.

The input transmission unit 18 transmits power provided from the first driving source 11 to the planetary gear mechanism 15. The input transmission unit 18 includes a first gear 27, a second gear 28, and a first transmission shaft 29.

The first gear 27 is connected to an output shaft of a motor forming the first driving source 11, and rotates along with a drive of the first driving source 11. The second gear 28 is engaged with the first gear 27, and rotates in a direction opposite to the first gear 27 along with rotation of the first gear 27. The first transmission shaft 29 connects the second gear 28 and the planet carrier 25, and transmits rotation of the second gear 28 to the planet carrier 25. As a result of this, along with rotation of the second gear 28, the planet carrier 25 turns (revolves) around the sun gear 23.

As shown in FIG. 5, the power transmission mechanism 14 includes an output shaft 22.

Through the output shaft 22, power is output from the planetary gear mechanism 15.

One of ends of the output shaft 22 is connected to a center of the internal gear 26 of the planetary gear mechanism 15. The other end of the output shaft 22 is connected to a divisional transmission unit 21 which will be later described. As a result of this, power which is output from the planetary gear mechanism 15 to the output shaft 22 is transmitted to the divisional transmission unit 21.

As shown in FIG. 5, the driving unit 10 includes a first shaft 16.

The first shaft 16 is a shaft which transmits power provided from the first driving source 11. More specifically, the first shaft 16 transmits power provided from the first driving source 11 to the power transmission mechanism 14.

One of ends of the first shaft 16 is connected to the first driving source 11. The other end of the first shaft 16 is connected to the planet carrier 25 of the planetary gear mechanism 15 via the input transmission unit 18. As a result of this, power which is transmitted from the first driving source 11 to the first shaft 16 is input to the planetary gear mechanism 15 via the input transmission unit 18.

As shown in FIG. 5, the driving unit 10 includes a second shaft 17.

The second shaft 17 is a shaft which transmits power provided from the second driving source 12 different from the first driving source 11. More specifically, the second shaft 17 transmits power provided from the second driving source 12 to the power transmission mechanism 14.

One of ends of the second shaft 17 is connected to a PTO shaft 13 via a connecting unit 50 such as a shaft coupling. As a result of this, power of the second driving source 12 is transmitted to the second shaft 17 via the PTO shaft 13 and the connecting unit 50. The other end of the second shaft 17 is connected to a center of the sun gear 23 forming the planetary gear mechanism 15. As a result of this, power which is transmitted from the second driving source 12 to the second shaft 17 is input to the planetary gear mechanism 15.

As shown in FIG. 5, the power transmission mechanism 14 includes the divisional transmission unit 21.

The divisional transmission unit 21 transmits power output from the output shaft 22 in such a manner that the power is divided between one and the other. In the present embodiment, the divisional transmission unit 21 includes a first transmission gear 30, a second transmission gear 31, and a second transmission shaft 32.

A center of the first transmission gear 30 is connected to the other end of the output shaft 22 and one of ends of the second transmission shaft 32. The output shaft 22 and the second transmission shaft 32 extend from a center of the first transmission gear 30 in directions opposite to each other. The second transmission gear 31 is engaged with the first transmission gear 30. As a result of this, in the divisional transmission unit 21, power output from the output shaft 22 is transmitted from the first transmission gear 30 in such a manner that the power is divided between the second transmission gear 31 (one) and the second transmission shaft 32 (the other).

As shown in FIG. 5, the power transmission mechanism 14 includes a first power transmission unit 19.

The first power transmission unit 19 transmits power which is transmitted from the divisional transmission unit 21 to the one (the second transmission gear 31), to the first rotating body 810. The first power transmission unit 19 includes a third transmission shaft 33, a gear mechanism (a third gear 34, a fourth gear 35, a fifth gear 36, and a sixth gear 37), and a first connecting shaft 38. Each of the gears (the third to sixth gears 34 to 37) forming the first power transmission unit 19 is a bevel gear.

One of ends of the third transmission shaft 33 is connected to a center of the second transmission gear 31. The other end of the third transmission shaft 33 is connected to a center of the third gear 34. The fourth gear 35 is engaged with the third gear 34. A direction of a rotation axis of the third gear 34 crosses a direction of a rotation axis of the fourth gear 35.

The fourth gear 35 is connected to the fifth gear 36 via the first connecting shaft 38. Accordingly, the fifth gear 36 rotates at the same speed and in the same direction as the fourth gear 35. The sixth gear 37 is engaged with the fifth gear 36. A direction of a rotation axis of the sixth gear 37 crosses a direction of a rotation axis of the fifth gear 36. A center of the sixth gear 37 is connected to a center axis of the first rotating body 810. As a result of this, power caused by rotation of the sixth gear 37 is transmitted to the first rotating body 810.

A transmission gear ratio of the first power transmission unit 19 (a ratio between a rotational speed of the third gear 34 and a rotational speed of the sixth gear 37) is set in accordance with a rotational speed which is required for rotation of the first rotating body 810. Additionally, for the first power transmission unit 19, a belt mechanism or a chain mechanism may be used in place of a gear mechanism.

As shown in FIG. 5, the power transmission mechanism 14 includes a second power transmission unit 20.

The second power transmission unit 20 transmits power which is transmitted from the divisional transmission unit 21 to the other (the second transmission shaft 32), to the second rotating body 820. The second power transmission unit 20 includes a gear mechanism (a seventh gear 39, an eighth gear 40, a ninth gear 41, and a tenth gear 42), and a second connecting shaft 43. Each of the gears (the seventh to tenth gears 39 to 42) forming the second power transmission unit 20 is a bevel gear.

A center of the seventh gear 39 is connected to the other end of the second transmission shaft 32. The eighth gear 40 is engaged with the seventh gear 39. A direction of a rotation axis of the eighth gear 40 crosses a direction of a rotation axis of the seventh gear 39.

The ninth gear 41 is connected to the eighth gear 40 via the second connecting shaft 43. Accordingly, the ninth gear 41 rotates at the same speed and in the same direction as the eighth gear 40. The tenth gear 42 is engaged with the ninth gear 41. A direction of a rotation axis of the tenth gear 42 crosses a direction of a rotation axis of the ninth gear 41. A center of the tenth gear 42 is connected to a center axis of the second rotating body 820. As a result of this, power caused by rotation of the tenth gear 42 is transmitted to the second rotating body 820.

A transmission gear ratio of the second power transmission unit 20 (a ratio between a rotational speed of the seventh gear 39 and a rotational speed of the tenth gear 42) is set in accordance with a rotational speed which is required for rotation of the second rotating body 820. Additionally, for the second power transmission unit 20, a belt mechanism or a chain mechanism may be used in place of a gear mechanism.

Hereinafter, functions (operations) of the driving unit 10 according to the first embodiment will be described.

Power provided from the first driving source 11 is input to the planetary gear mechanism 15 via the first shaft 16 and the input transmission unit 18. Power provided from the second driving source 12 is input to the planetary gear mechanism 15 via the PTO shaft 13, the connecting unit 50, and the second shaft 17.

Power input to the planetary gear mechanism 15 is output from the output shaft 22 and is transmitted to the divisional transmission unit 21. The divisional transmission unit 21 transmits power output from the output shaft 22 in such a manner that the power is divided between one (the second transmission gear 31) and the other (the second transmission shaft 32). That is, the divisional transmission unit 21 transmits power provided from the first driving source 11 and power provided from the second driving source 12 in such a manner that each power is divided between one and the other.

Power transmitted from the divisional transmission unit 21 to the one (the second transmission gear 31) is transmitted to the first rotating body 810 via the first power transmission unit 19. Power transmitted from the divisional transmission unit 21 to the other (the second transmission shaft 32) is transmitted to the second rotating body 820 via the second power transmission unit 20.

Therefore, power provided from the first driving source 11 can cause the first rotating body 810 and the second rotating body 820 to rotate. Also, power provided from the second driving source 12 can cause the first rotating body 810 and the second rotating body 820 to rotate. In other words, the first rotating body 810 and the second rotating body 820 can be caused to rotate by using either power of the first driving source 11 or power of the second driving source 12. Also, the first rotating body 810 and the second rotating body 820 can be caused to rotate by using both of power of the first driving source 11 and power of the second driving source 12. Further, since a speed of the first driving source 11 is changeable, it is possible to change rotational speeds of the first rotating body 810 and the second rotating body 820 by changing a speed of the first driving source 11.

Second Embodiment of Driving Unit

Next, with reference to FIG. 6, a second embodiment of a driving unit 10 will be described.

The driving unit 10 according to the second embodiment includes a first driving source 11, and a power transmission mechanism 14 including a third driving source 44.

The first driving source 11 is identical to that in the first embodiment, and therefore, description thereof is omitted.

The third driving source 44, as with the first driving source 11, is a driving source of which speed is changeable. More specifically, the third driving source 44 is a motor. In the present embodiment, the third driving source 33 is an electric motor. The third driving source 44 is a driving source used mainly for changing rotational speeds of a first rotating body 810 and a second rotating body 820.

The power transmission mechanism 14, as with that in the first embodiment, is a mechanism to transmit power of the first driving source 11 and power of a second driving source 12 to the first rotating body 810 and the second rotating body 820. More particularly, the power transmission mechanism 14 transmits power of the first driving source 11 to the first rotating body 810 and the second rotating body 820, and transmits power of the second driving source 12 to the first rotating body 810 and the second rotating body 820. However, the power transmission mechanism 14 of the second embodiment is partially different in configuration from the power transmission mechanism 14 of the first embodiment.

Figure 6:
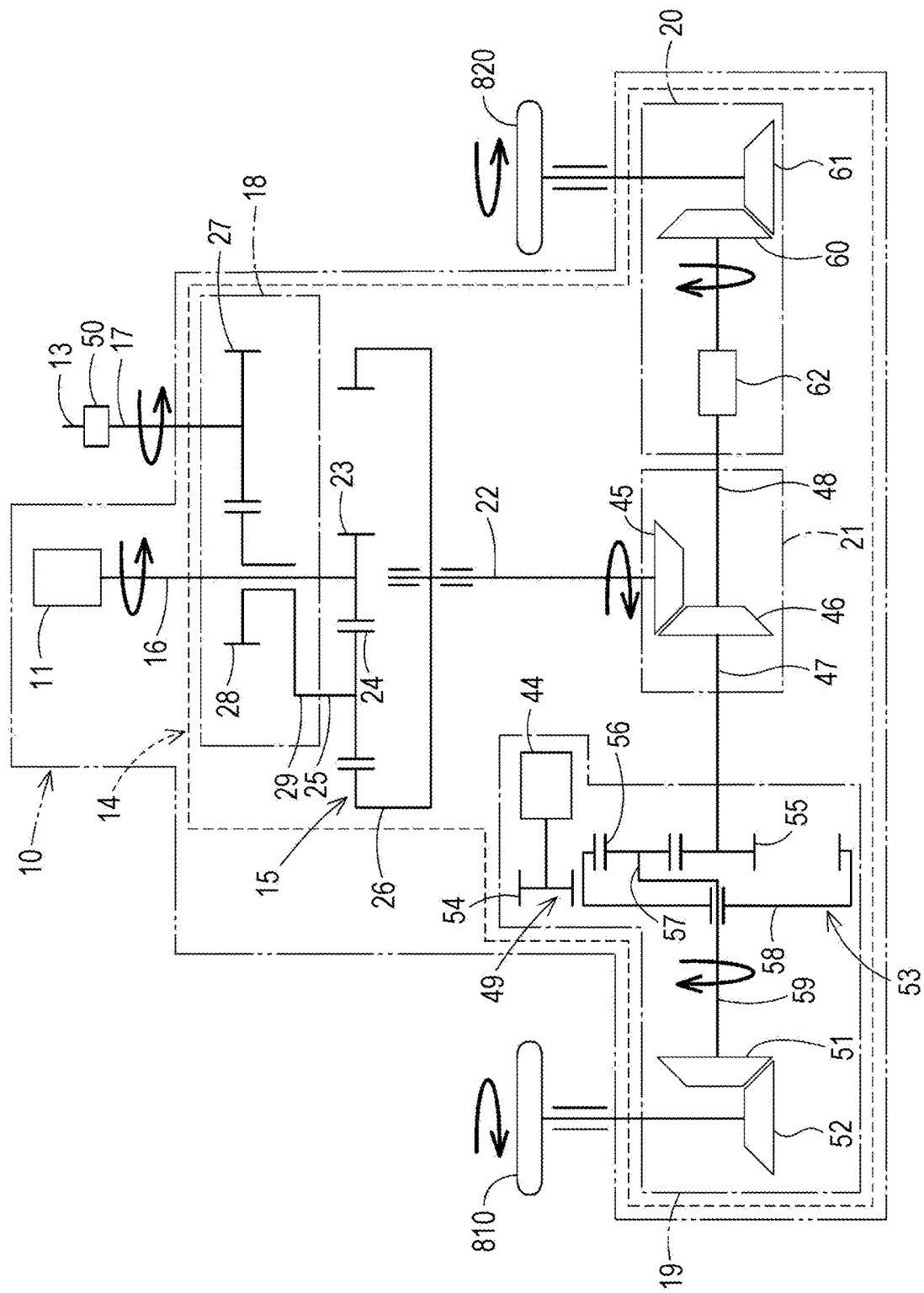
FIG. 6 is a view showing a second embodiment of the driving unit.

As shown in FIG. 6, the power transmission mechanism 14 includes a planetary gear mechanism 15.

The planetary gear mechanism 15 includes a sun gear 23, a planet gear 24, a planet carrier 25, and an internal gear 26.

The sun gear 23 is engaged with the planet gear 24. The planet gear 24 is rotatably supported by the planet carrier 25, and can turn (revolve) around the sun gear 23. The planet carrier 25 rotates along with turning (revolution) of the planet gear 24. The internal gear 26 is engaged with the planet gear 24.

Hereinafter, in order to distinguish the planetary gear mechanism 15 from another planetary gear mechanism 53 which will be later described, the planetary gear mechanism 15 will be referred to as a "first planetary gear mechanism 15" for convenience's sake. Also, the sun gear 23, the planet gear 24, the planet carrier 25, and the internal gear 26 will be referred to as a first sun gear 23, a first planet gear 24, a first planet carrier 25, and a first internal gear 26, respectively.

As shown in FIG. 6, the power transmission mechanism 14 includes an input transmission unit 18.

The input transmission unit 18 transmits power provided from the second driving source 12 to the first planetary gear mechanism 15. The input transmission unit 18 includes a first gear 27, a second gear 28, and a first transmission shaft 29.

The first gear 27 rotates along with a drive of the second driving source 12. Power provided from the second driving source 12 is transmitted to the first gear 27 via a second shaft 17 which will be later described. The second gear 28 is engaged with the first gear 27, and rotates in a direction opposite to the first gear 27 along with rotation of the first gear 27. The first transmission shaft 29 connects the second gear 28 and the first planet carrier 25, and transmits rotation of the second gear 28 to the first planet carrier 25. As a result of this, along with rotation of the second gear 28, the first planet carrier 25 turns (revolves) around the first sun gear 23.

As shown in FIG. 6, the power transmission mechanism 14 includes an output shaft 22.

Through the output shaft 22, power is output from the first planetary gear mechanism 15.

One of ends of the output shaft 22 is connected to a center of the first internal gear 26 of the first planetary gear mechanism 15. The other end of the output shaft 22 is connected to a divisional transmission unit 21 which will be later described. As a result of this, power which is output from the first planetary gear mechanism 15 to the output shaft 22 is transmitted to the divisional transmission unit 21.

As shown in FIG. 6, the driving unit 10 includes a first shaft 16.

The first shaft 16 is a shaft which transmits power provided from the first driving source 11. More specifically, the first shaft 16 transmits power provided from the first driving source 11 to the power transmission mechanism 14.

One of ends of the first shaft 16 is connected to the first driving source 11. The other end of the first shaft 16 is connected to a center of the first sun gear 23 of the first planetary gear mechanism 15. As a result of this, power which is transmitted from the first driving source 11 to the first shaft 16 is input to the first planetary gear mechanism 15.

As shown in FIG. 6, the driving unit 10 includes the second shaft 17.

The second shaft 17 is a shaft which transmits power provided from the second driving source 12 different from the first driving source 11. More specifically, the second shaft 17 transmits power provided from the second driving source 12 to the power transmission mechanism 14.

One of ends of the second shaft 17 is connected to a PTO shaft 13 via a connecting unit 50 such as a shaft coupling. As a result of this, power of the second driving source 12 is transmitted to the second shaft 17 via the PTO shaft 13 and the connecting unit 50. The other end of the second shaft 17 is connected to the first gear 27 of the input transmission unit 18. Accordingly, the other end of the second shaft 17 is connected to the first planet carrier 25 of the first planetary gear mechanism 15 via the input transmission unit 18. Thus, power which is transmitted from the second driving source 12 to the second shaft 17 is input to the first planetary gear mechanism 15 via the input transmission unit 18.

As shown in FIG. 6, the power transmission mechanism 14 includes the divisional transmission unit 21.

The divisional transmission unit 21 transmits power output from the output shaft 22 in such a manner that the power is divided between one and the other. In the second embodiment, the divisional transmission unit 21 includes a third transmission gear 45, a fourth transmission gear 46, a one-side transmission shaft 47, and an other-side transmission shaft 48.

A center of the third transmission gear 45 is connected to the other end of the output shaft 22. The fourth transmission gear 46 is engaged with the third transmission gear 45. Each of the gears (the third transmission gear 45 and the fourth transmission gear 46) forming the divisional transmission unit 21 is a bevel gear. A direction of a rotation axis of the third transmission gear 45 crosses a direction of a rotation axis of the fourth transmission gear 46.

The fourth transmission gear 46 is connected to one end of the one-side transmission shaft 47 and one end of the other-side transmission shaft 48. The one-side transmission shaft 47 and the other-side transmission shaft 48 extend from a center of the fourth transmission gear 46 in directions opposite to each other.

As a result of this, in the divisional transmission unit 21, power output from the output shaft 22 is transmitted from the fourth transmission gear 46 in such a manner that the power is divided between the one-side transmission shaft 47 (one) and the other-side transmission shaft 48 (the other).

As shown in FIG. 6, the power transmission mechanism 14 includes a first power transmission unit 19.

The first power transmission unit 19 transmits power which is transmitted from the divisional transmission unit 21 to the one (the one-side transmission shaft 47), to the first rotating body 810. The first power transmission unit 19 includes a speed changing unit 49, a transmission shaft 59, a fifth transmission gear 51, and a sixth transmission gear 52.

The speed changing unit 49 includes the third driving source 44. The speed changing unit 49 changes a rotational speed of the first rotating body 810 or the second rotating body 820 in accordance with a change of a speed of the third driving source 44. The speed changing unit 49 includes a planetary gear mechanism (which will hereinafter be referred to as a "second planetary gear mechanism") 53 and a driving gear 54.

The second planetary gear mechanism 53 includes a second sun gear 55, a second planet gear 56, a second planet carrier 57, and a second internal gear 58.

The second sun gear 55 is engaged with the second planet gear 56. The second sun gear 55 is connected to the divisional transmission unit 21. More specifically, a center of the second sun gear 55 is connected to the other end of the one-side transmission shaft 47. The second planet gear 56 is engaged with the second sun gear 55. The second planet gear 56 is rotatably supported by the second planet carrier 57, and can turn (revolve) around the second sun gear 55. The second planet carrier 57 rotates along with turning (revolution) of the second planet gear 56.

The second internal gear 58 includes an internal tooth formed in an inner surface thereof and an external tooth formed in an outer surface thereof. The internal tooth is engaged with the second planet gear 56. The external tooth is engaged with the driving gear 54 which is caused to rotate by power provided from the third driving source 44.

The second planet carrier 57 is connected to one end of the transmission shaft 59. The other end of the transmission shaft 59 is connected to a center of the fifth transmission gear 51. The sixth transmission gear 52 is engaged with the fifth transmission gear 51. A direction of a rotation axis of the sixth transmission gear 52 crosses a direction of a rotation axis of the fifth transmission gear 51. A center of the sixth transmission gear 52 is connected to a center axis of the first rotating body 810. As a result of this, power caused by rotation of the sixth transmission gear 52 is transmitted to the first rotating body 810.

The second sun gear 55 transmits power to the second rotating body 820 via the divisional transmission unit 21. The second planet gear 56 transmits power to the first rotating body 810 via the second planet carrier 57 and the transmission shaft 59.

Additionally, a center of the second sun gear 55 may be connected to one end of the transmission shaft 59, the other end of the transmission shaft 59 may be connected to a center of the fifth transmission gear 51, the second planet carrier 57 may be connected to the other end of the one-side transmission shaft 47, and one end of the one-side transmission shaft 47 may be connected to the fourth transmission gear 46. In this case, the second planet gear 56 transmits power to the second rotating body 820 via the second planet carrier 57 and the divisional transmission unit 21, and the second sun gear 55 transmits power to the first rotating body 810 via the transmission shaft 59.

As shown in FIG. 6, the power transmission mechanism 14 includes a second power transmission unit 20.

The second power transmission unit 20 transmits power transmitted from the divisional transmission unit 21 to the other (the other-side transmission shaft 48), to the second rotating body 820.

The second power transmission unit 20 includes a switching unit 62. The switching unit 62 can be switched between a first state in which power transmitted from the divisional transmission unit 21 to the other (the other-side transmission shaft 48) is transmitted to the second rotating body 820 and a second state in which the foregoing power is not transmitted to the second rotating body 820. The switching unit 62 includes a clutch or the like which can be turned on and off with an operation lever or the like, for example. It is preferable that the switching unit 62 includes an electric clutch, however, the switching unit 62 may include a mechanical clutch.

The second power transmission unit 20 includes a seventh transmission gear 60 and an eighth transmission gear 61. Each of the gears (the seventh transmission gear 60 and the eighth transmission gear 61) forming the second power transmission unit 20 is a bevel gear.

A center of the seventh transmission gear 60 is connected to the other end of the other-side transmission shaft 48 via the switching unit 62. When the switching unit 62 is placed in a first state, power provided from the other-side transmission shaft 48 is transmitted to the seventh transmission gear 60. When the switching unit 62 is placed in a second state, power provided from the other-side transmission shaft 48 is not transmitted to the seventh transmission gear 60. The eighth transmission gear 61 is engaged with the seventh transmission gear 60. A direction of a rotation axis of the eighth transmission gear 61 crosses a direction of a rotation axis of the seventh transmission gear 60. A center of the eighth transmission gear 61 is connected to a center axis of the second rotating body 820.

When the switching unit 62 is placed in a first state, power which is transmitted from the divisional transmission unit 21 to the other (the other-side transmission shaft 48) is transmitted to the second rotating body 820 via the switching unit 62, the seventh transmission gear 60, and the eighth transmission gear 61. When the switching unit 62 is placed in a second state, power which is transmitted from the divisional transmission unit 21 to the other (the other-side transmission shaft 48) is not transmitted to the second rotating body 820 because transmission to the seventh transmission gear 60 is interrupted in the switching unit 62.

It is noted that the switching unit 62 may be provided in the first power transmission unit 19, instead of being provided in the second power transmission mechanism 20. The speed changing unit 49 may be provided in the second power transmission mechanism 20, instead of being provided in the first power transmission unit 19.

Also, it is preferable that the second power transmission unit 20 includes the switching unit 62, however, the second power transmission unit 20 may be a unit not including the switching unit 62. In a case where the second power transmission unit 20 does not include the switching unit 62, the other end of the other-side transmission shaft 48 is connected directly to a center of the seventh transmission gear 60.

Hereinafter, functions (operations) of the driving unit 10 according to the second embodiment will be described.

Power provided from the first driving source 11 is input to the planetary gear mechanism 15 via the first shaft 16. Power provided from the second driving source 12 is input to the first planetary gear mechanism 15 via the PTO shaft 13, the connecting unit 50, the second shaft 17, and the input transmission unit 18.

Power input to the first planetary gear mechanism 15 is output from the output shaft 22, and is transmitted to the divisional transmission unit 21. The divisional transmission unit 21 transmits power output from the output shaft 22 in such a manner that the power is divided between one (the one-side transmission shaft 47) and the other (the other-side transmission shaft 48). That is, the divisional transmission unit 21 transmits power provided from the first driving source 11 and power provided from the second driving source 12 in such a manner that each power is divided between one and the other.

Power which is transmitted from the divisional transmission unit 21 to the one (the one-side transmission shaft 47) is transmitted to first rotating body 810 via the first power transmission unit 19. Power which is transmitted from the divisional transmission unit 21 to the other (the other-side transmission shaft 48) is transmitted to the second rotating body 820 via the second power transmission unit 20 by a switching operation of placing the switching unit 62 in a first state.

Accordingly, power provided from the first driving source 11 can cause the first rotating body 810 and the second rotating body 820 to rotate. Also, power provided from the second driving source 12 can cause the first rotating body 810 and the second rotating body 820 to rotate. That is, the first rotating body 810 and the second rotating body 820 can be caused to rotate by using either power of the first driving source 11 or power of the second driving source 12. Also, the first rotating body 810 and the second rotating body 820 can be caused to rotate by using both of power of the first driving source 11 and power of the second driving source 12. Moreover, since a speed of the first driving source 11 is changeable, it is possible to change rotational speeds of the first rotating body 810 and the second rotating body 820 by changing a speed of the first driving source 11.

Further, since the power transmission mechanism 14 includes the speed changing unit 49, the driving unit 10 according to the second embodiment makes a rotational speed of the first rotating body 810 and a rotational speed of the second rotating body 820 different from each other.

Hereinafter, functions of the speed changing unit 49 will be described.

When the third driving source 44 of the speed changing unit 49 is driven, power provided from the third driving source 44 is transmitted to an external tooth of the second internal gear 58 via the driving gear 54. Thus, when the third driving source 44 is driven, the second internal gear 58 rotates. Rotation of the second internal gear 58 is transmitted to the second planet gear 56 via the internal tooth of the second internal gear 58, so that the second planet gear 56 rotates. Along with rotation of the second planet gear 56, the second sun gear 55 rotates, and power caused by the rotation of the second sun gear 55 is transmitted to the first rotating body 810 via the transmission shaft 59, the fifth transmission gear 51, and the sixth transmission gear 52.

In this manner, power provided from the speed changing unit 49 including the third driving source 44 is transmitted to the first rotating body 810. Thus, a rotational speed of the first rotating body 810 is changed in accordance with a change of a speed of the third driving source 44. As a result of this, it is possible to make a rotational speed of the first rotating body 810 and a rotational speed of the second rotating body 820 different from each other.

Also, there may be provided a configuration in which the speed changing unit 49 is provided in the second power transmission unit 20 so that power provided from the third driving source 44 is transmitted to the speed changing unit 49 (the external tooth of the second internal gear 58) of the second power transmission unit 20. In a case where the foregoing configuration is employed, a rotational speed of the second rotating body 820 is changed in accordance with a change of a speed of the third driving source 44. Also the foregoing configuration makes a rotational speed of the first rotating body 810 and a rotational speed of the second rotating body 820 different from each other.

Hereinafter, functions of the switching unit 62 will be described.

By a switching operation of placing the switching unit 62 in a second state, power which is transmitted from the divisional transmission unit 21 to the other (the other-side transmission shaft 48) is not transmitted to the second rotating body 820. Accordingly, it is possible to stop the second rotating body 820 and drive only the first rotating body 810 with the second driving source 12 being driven. In other words, it is possible to stop the second rotating body 820 without stopping rotation of the PTO shaft 13.

In a case where the switching unit 62 is not included, in order to stop the second rotating body 820 and drive only the first rotating body 810, it is necessary to stop the first driving source 11 and the second driving source 12 and drive the third driving source 44. That is, it is necessary to stop rotation of the PTO shaft 13. In contrast thereto, in a case where the switching unit 62 is included, it is unnecessary to stop rotation of the PTO shaft 13 as described above.

Also, in a case where the switching unit 62 is not included, the first rotating body 810 should be driven by power provided from the third driving source 44, which requires an increase of an output of the third driving source 44. In contrast thereto, in a case where the switching unit 62 is included, the third driving source 44 can be used only for a change of a speed, so that an output of the third driving source 44 can be reduced.

FIGS. 7 and 8 show examples of an operation pattern of the driving unit 10 according to the second embodiment, in a form of a table. FIGS. 7 and 8 show certain examples of a relationship among a rotational speed (M1) of the first driving source 11, a rotational speed (A1) of the first shaft 16, a rotational speed (S1) of the second driving source 12, a rotational speed (C1) of the internal gear 26, a rotational speed (M2) of the third driving source 44, a rotational speed (C2) of the second internal gear 58, a rotational speed (A2) of the one-side transmission shaft 47, a rotational speed (S2) of the transmission shaft 59, a rotational speed (B1) of the first rotating body 810, and a rotational speed (B2) of the second rotating body 820. In those examples, it is set so that a transmission gear ratio of the input transmission unit 18 is one, a transmission gear ratio of the planetary gear mechanism 15 is ⅓, a transmission gear ratio of the second planetary gear mechanism 53 is ⅓, a ratio of the number of external teeth of the second internal gear 58 to the number of teeth of the driving gear 54 is 1 to 1, a ratio of the number of teeth of the fifth transmission gear 51 to those of the sixth transmission gear 52 is 1 to 1, a ratio of the number of teeth of the third transmission gear 45 to those of the fourth transmission gear 46 is 1 to 1, and a transmission gear ratio of the second power transmission unit 20 (a ratio of the number of teeth of the seventh transmission gear 60 to those of the eighth transmission gear 61) is 1/2.641. Also, a unit of numeric values in the table is (rpm). A difference in a rotation direction is represented with the use of symbols "+" (plus) and "−" (minus).

A column (A) in FIG. 7 shows an operation pattern in which the first rotating body 810 is stopped and a rotational speed of the second rotating body 820 is changed. A column (B) in FIG. 7 shows an operation pattern in which rotational speeds of the first rotating body 810 and the second rotating body 820 are kept equal to each other and the respective numbers of rotations of the two rotating bodies are changed. A column (C) in FIG. 8 shows an operation pattern in which a ratio between rotational speeds of the first rotating body 810 and the second rotating body 820 is changed and the respective numbers of rotations of the two rotating bodies are changed. A column (D) in FIG. 8 shows an operation pattern in which the second rotating body 820 is stopped and a rotational speed of the first rotating body 810 is changed. In the operations patterns shown in the columns (A) to (C), the switching unit 62 is switched to a first state. In the operation pattern shown in the column (D), the switching unit 62 is switched to a second state.

As shown in FIGS. 7 and 8, the driving unit 10 according to the second embodiment makes it possible to implement the operation pattern in which the first rotating body 810 is stopped and a rotational speed of the second rotating body 820 is changed, the operation pattern in which rotational speeds of the first rotating body 810 and the second rotating body 820 are kept equal to each other and the respective numbers of rotations of the two rotating bodies are changed, the operation pattern in which a ratio between rotational speeds of the first rotating body 810 and the second rotating body 820 is changed and the respective numbers of rotations of the two rotating bodies are changed, and the operation pattern in which the second rotating body 820 is stopped and a rotational speed of the first rotating body 810 is changed.

In a modification, the spreading device 2 may have a configuration in which the containing unit 7 to contains a spread material, the first spreading unit 81 including the first rotating body 810 to spread the spread material contained in the containing unit 7, the second spreading unit 82 including the second rotating body 820 to spread the spread material contained in the containing unit 7, the first power transmission unit 19 to transmit power to the first rotating body 810, and the second power transmission unit 82 to transmit power to the second rotating body 820, are included, and the first power transmission unit 19 or the second power transmission unit 20 includes the speed changing unit 49 including a driving source changing a rotational speed of the first rotating body 810 or the second rotating body 820 by causing rotary power to act on a path through which power is transmitted to the first rotating body 810 or the second rotating body 820.

More specifically, in the embodiment shown in FIG. 6 (the second embodiment of the driving unit 20), for example, there may be provided a configuration in which only one of the first driving source 11 and the second driving source 12 is provided and an output from the one driving source is transmitted to the power transmission mechanism 14. In this case, power provided from one of the first driving source 11 and the second driving source 12 is transmitted to the output shaft 22, and power provided from the one driving source is output to the divisional transmission unit 21 through the output shaft 22. Also, in this configuration, the first power transmission unit 19 through which power is transmitted from the divisional transmission unit 21 to the first rotating body 810, or the second power transmission unit 20 through which power is transmitted from the divisional transmission unit 21 to the second rotating body 820, includes the speed changing unit 49. The speed changing unit 49 includes a driving source of which speed is changeable (the third driving source 44 (motor), for example). The driving source changes a rotational speed of the first rotating body 810 or the second rotating body 820 by causing rotary power to act on a path through which power is transmitted to the first rotating body 810 (a path through which power is transmitted from the one-side transmission shaft 47 to the first rotating body 810), or a path through which power is transmitted to the second rotating body 820 (a path through which power is transmitted from the other-side transmission shaft 48 to the second rotating body 820). For a configuration of the speed changing unit 49, the configuration shown in FIG. 6 (the above-described configuration including the second planetary gear mechanism 53 and the driving gear 45) may be employed.

According to the above-described embodiments, the spreading device includes the containing unit 7 to contain a spread material, the first spreading unit 81 including the first rotating body 810 to spread the spread material contained in the containing unit 7, the second spreading unit 82 including the second rotating body 820 to spread the spread material contained in the containing unit 7, the first driving source 11 of which speed is changeable, the first shaft 16 to transmit power provided from the first driving source 11, the second shaft 17 to transmit power provided from the second driving source 12 different from the first driving source 11, and the power transmission mechanism 14 to receive power from the first shaft 16 and power from the second shaft 17 to transmit the power received from the first shaft 16 and the power received from the second shaft 17 to the first rotating body 810 and the second rotating body 820.

With the above-described configuration, power provided from the first driving source 11 and the second driving source 12 is transmitted to a rotating body (the first rotating body 810 and the second rotating body 820), and a speed of the first driving source 11 is changeable, so that a rotational speed of the rotating body to spread a spread material is changed as needed. The above-described configuration thus achieves optimal spreading in accordance with a shape of a field, a position of a spreading device, a position where a crop is to be planted, or the like.

Also, the mounting unit 9 mounted onto the traveling vehicle 3 is included, the first driving source 11 is a motor, the second driving source 12 is an internal combustion engine (engine) provided in the traveling vehicle 3, and power of the second driving source 12 is transmitted to the second shaft 17 via the PTO shaft 13 of the traveling vehicle 3.

By using an internal combustion engine provided in the traveling vehicle 3 as the second driving source 12, the foregoing configuration utilizes an already-existing driving source (internal combustion engine) provided in the traveling vehicle 3 without preparing a new driving source (such as a motor) as the second driving source 12. Also, by using both of power provided from a motor which is the first driving source 11 and power provided from an internal combustion engine which is the second driving source 12, power consumption is reduced as compared to a case where two motors are used. Also, with a motor which is the first driving source 11, a rotational speed of a rotating body is easily changed.

Also, the power transmission mechanism 14 includes the planetary gear mechanism 15 to receive power from the first shaft 16 and power from the second shaft 16, the output shaft 22 through which power is output from the planetary gear mechanism 15, the divisional transmission unit 21 to transmit power output from the output shaft 22 in such a manner that the power is divided between one and the other, the first power transmission unit 19 to transmit power transmitted to the one, to the first rotating body 810, and the second power transmission unit 20 to transmit power transmitted to the other, to the second rotating body 820.

With the foregoing configuration, power output from the planetary gear mechanism 15 via the output shaft 22 is transmitted in such a manner that the power is divided between the first rotating body 810 and the second rotating body 820, by the divisional transmission unit 21. Thus, power provided from the first driving source 11 or the second driving source 12 is transmitted in such a manner that the power is divided between the first rotating body 810 and the second rotating body 820.

Also, the planetary gear mechanism 15 includes the sun gear 23 to receive power from the second shaft 17, and the planet gear 24 engaged with the sun gear 23 to receive power from the first shaft 16, and the internal gear 26 engaged with the planet gear 24.

With the foregoing configuration, power provided from the first driving source 11 is input to the planet gear 24 of the planetary gear mechanism 15 via the first shaft 16. Also, power provided from the second driving source 12 is input to the sun gear 23 of the planetary gear mechanism 15 via the second shaft 17.

Also, included is the speed changing unit 49 including the third driving source 44 of which speed is changeable, being different from the first driving source 11 and the second driving source 12, and the speed changing unit 49 changes a rotational speed of the first rotating body 810 or the second rotating body 820 in accordance with a change of a speed of the third driving source 44.

Figure 9:
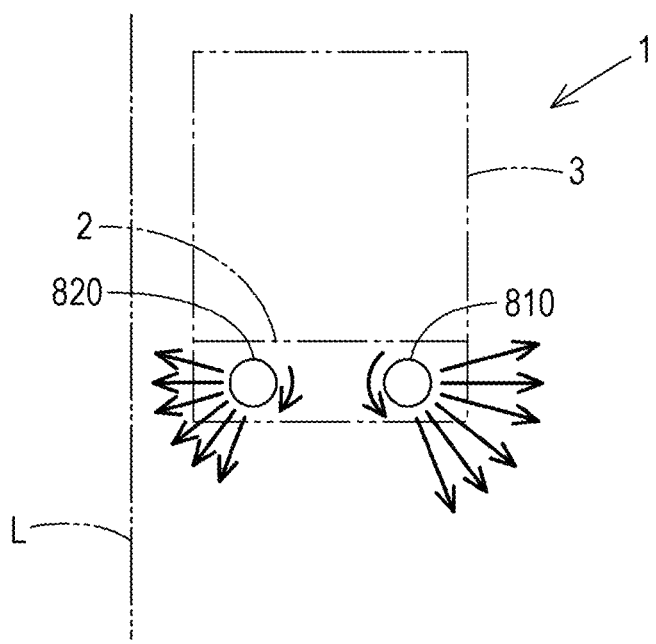
FIG. 9 is a plan view showing an example of a spreading method.

With the foregoing configuration, a rotational speed of the first rotating body 810 or the second rotating body 820 is changed in accordance with a change of a speed of the third driving source 44, so that a rotational speed of the first rotating body 810 and a rotational speed of the second rotating body 820 are made different from each other. The foregoing configuration thus achieves optimal spreading in accordance with a shape of a field, a position of a spreading device, a position where a crop is to be planted, or the like. For example, by making a rotational speed of the first rotating body 810 higher than a rotational speed of the second rotating body 820, the foregoing configuration enables to make a spreading distance in one of directions along a vehicle width, longer than a spreading distance in the other direction along a vehicle width. As a result of this, in a case where the tractor 3 performs spreading while traveling near a boundary line L of a field as shown in FIG. 9, for example, a spread material is prevented from being spread beyond the boundary line L by reduction of a rotational speed of a rotating body (the second rotating body 820) located closer to the boundary line L. The boundary line L includes a line representing an edge of a field (a boundary line between a field and a road, a boundary line between a field and a building, a boundary line between a field and another field, and the like), a boundary line between a field for one kind of crop and a field for another kind of crop, and the like.

Also, the planetary gear mechanism 15 includes the first sun gear 23 to receive power from the first shaft 16, the first planet gear 24 engaged with the first sun gear 23 to receive power from the second shaft 17, and the first internal gear 26 engaged with the first planet gear 24.

With the foregoing configuration, power provided from the first driving source 11 is input to the first sun gear 23 of the planetary gear mechanism 15 via the first shaft 16. Also, power provided from the second driving source 12 is input to the first planet gear 24 of the planetary gear mechanism 15 via the second shaft 17.

Also, the speed changing unit 49 includes the second sun gear 55 connected to the divisional transmission unit 21 to transmit power to the second rotating body 820, the second planet gear 56 engaged with the second sun gear 55 to transmit power to the first rotating body 810, and the second internal gear 58 including an internal tooth engaged with the second planet gear 56 and an external tooth to which power provided from the third driving source 44 is transmitted.

With the foregoing configuration, power provided from the third driving source 44 is input to the second internal gear 58, and the power is then transmitted to the first rotating body 810 from the second internal gear 58 via the second planet gear 56, so that the power is transmitted to the second rotating body 820 via the second sun gear 55. Accordingly, by changing a speed of the third driving source 44, a rotational speed of the first rotating body 810 or the second rotating body 820 is changed. As a result of this, a rotational speed of the first rotating body 810 and a rotational speed of the second rotating body 820 are made different from each other. The foregoing configuration thus achieves optimal spreading in accordance with a shape of a field, a position of a spreading device, a position where a crop is to be planted, or the like. Also, since power is transmitted using both of the internal tooth and the external tooth of the second internal gear 58, the speed changing unit 49 is reduced in size.

Also, the spreading device 2 includes the containing unit 7 to contain a spread material, the first spreading unit 81 including the first rotating body 810 to spread the spread material contained in the containing unit 7, the second spreading unit 82 including the second rotating body 820 to spread the spread material contained in the containing unit 7, the first power transmission unit 19 to transmit power to the first rotating body 810, and the second power transmission unit 20 to transmit power to the second rotating body 820, and the first power transmission unit 19 or the second power transmission unit 20 includes the speed changing unit 49 including the driving source 44 changing a rotational speed of the first rotating body 810 or the second rotating body 820 by causing rotary power to act on a path through which power is transmitted to the first rotating body 810 or the second rotating body 820.

With the foregoing configuration, the driving source of the speed changing unit 49 changes a rotational speed of the first rotating body 810 or the second rotating body 820 by causing rotary power to act on a path through which power is transmitted to the first rotating body 810 or the second rotating body 820. As a result of this, a rotational speed of the first rotating body 810 and a rotational speed of the second rotating body 820 are made different from each other. The foregoing configuration thus achieves optimal spreading in accordance with a shape of a field, a position of a spreading device, a position where a crop is to be planted, or the like.

While the present invention has been described hereinabove, the embodiments disclosed herein are mere examples in all aspects and should be considered non-limitative. The scope of the present invention is shown by not the above description, but the claims, and it is intended to include all modifications within the scope of the claims and within meanings and range of equivalence.

Obviously, numerous modifications and variations of the present invention are possible in light of the above teachings. It is therefore to be understood that within the scope of the appended claims, the invention may be practiced otherwise than as specifically described herein.

What is claimed is:

1. A spreading device comprising:
   a containing unit to contain a spread material;
   a first spreading unit including a first rotating body to spread the spread material contained in the containing unit;
   a second spreading unit including a second rotating body to spread the spread material contained in the containing unit;
   a first driving source of which speed is changeable;
   a first shaft to transmit power provided from the first driving source;
   a second shaft to transmit power provided from a second driving source different from the first driving source;
   a power transmission mechanism to receive power from the first shaft and power from the second shaft to an output shaft, the power transmission mechanism being capable of transmitting the power received from the first shaft and the power received from the second shaft, via the output shaft to both the first rotating body and the second rotating body; and
   a mounting unit mounted onto a traveling vehicle, wherein
   the first driving source is a motor,
   the second driving source is an internal combustion engine provided in the traveling vehicle, and
   power provided from the second driving source is transmitted to the second shaft via a PTO shaft of the traveling vehicle.

2. The spreading device according to claim 1, wherein the power transmission mechanism includes a divisional transmission unit to transmit power from the output shaft in such a manner that the power is divided between a first transmission component to the first rotating body and a second transmission component to the second rotating body.

3. The spreading device according to claim 1, further comprising
   a speed changing unit including a third driving source of which speed is changeable, the third driving source being different from the first driving source and the second driving source, wherein
   the speed changing unit is capable of changing a rotational speed of the first rotating body or the second rotating body in accordance with a change of a speed of the third driving source.

4. A spreading device comprising:
   a containing unit to contain a spread material;
   a first spreading unit including a first rotating body to spread the spread material contained in the containing unit;
   a second spreading unit including a second rotating body to spread the spread material contained in the containing unit;
   a first driving source of which speed is changeable;
   a first shaft to transmit power provided from the first driving source;
   a second shaft to transmit power provided from a second driving source different from the first driving source;
   a power transmission mechanism to receive power from the first shaft and power from the second shaft the power transmission mechanism being capable of transmitting the power received from the first shaft and the power received from the second shaft, to the first rotating body and the second rotating body; and
   a mounting unit mounted onto a traveling vehicle, wherein
   the first driving source is a motor,
   the second driving source is an internal combustion engine provided in the traveling vehicle,
   power provided from the second driving source is transmitted to the second shaft via a PTO shaft of the traveling vehicle the power transmission mechanism includes:
- a planetary gear mechanism to receive power from the first shaft and power from the second shaft;
- an output shaft through which power is output from the planetary gear mechanism;
- a divisional transmission unit to transmit power that is output through the output shaft in such a manner that the power is divided between a first transmission component and a second transmission component;
- a first power transmission unit to transmit the power transmitted to the first transmission component, to the first rotating body; and
- a second power transmission unit to transmit the power transmitted to the second transmission component, to the second rotating body.

5. The spreading device according to claim 4, wherein the planetary gear mechanism includes
- a sun gear to receive power from the second shaft,
- a planet gear engaged with the sun gear to receive power from the first shaft, and
- an internal gear engaged with the planet gear.

6. The spreading device according to claim 5, further comprising
- a speed changing unit including a third driving source of which speed is changeable, the third driving source being different from the first driving source and the second driving source, wherein
- the speed changing unit is capable of changing a rotational speed of the first rotating body or the second rotating body in accordance with a change of a speed of the third driving source.

7. The spreading device according to claim 6, wherein the speed changing unit includes
- a second sun gear connected to the divisional transmission unit and being capable of transmitting power to the second rotating body;
- a second planet gear engaged with the second sun gear and being capable of transmitting power to the first rotating body; and
- a second internal gear including an internal tooth engaged with the second planet gear, and an external tooth to which power provided from the third driving source is transmitted.

8. The spreading device according to claim 4, further comprising
- a speed changing unit including a third driving source of which speed is changeable, the third driving source being different from the first driving source and the second driving source, wherein
- the speed changing unit is capable of changing a rotational speed of the first rotating body or the second rotating body in accordance with a change of a speed of the third driving source.

9. The spreading device according to claim 8, wherein the speed changing unit includes
- a second sun gear connected to the divisional transmission unit and being capable of transmitting power to the second rotating body;
- a second planet gear engaged with the second sun gear and being capable of transmit power to the first rotating body; and
- a second internal gear including an internal tooth engaged with the second planet gear, and an external tooth to which power provided from the third driving source is transmitted.

10. The spreading device according to claim 4, wherein the planetary gear mechanism includes
- a first sun gear to receive power from the first shaft,
- a first planet gear engaged with the first sun gear to receive power from the second shaft, and
- a first internal gear engaged with the first planet gear.

11. A spreading device comprising:
- a containing unit to contain a spread material;
- a first spreading unit including a first rotating body to spread the spread material contained in the containing unit;
- a second spreading unit including a second rotating body to spread the spread material contained in the containing unit;
- a first driving source of which speed is changeable;
- a second driving source different from the first driving source;
- a first power transmission unit to transmit power from the first driving source and the second driving source via an output shaft to the first rotating body; and
- a second power transmission unit to transmit power from the first driving source and the second driving source via the output shaft to the second rotating body, wherein
- the first power transmission unit or the second power transmission unit includes a speed changing unit including a third driving source capable of changing a rotational speed of the first rotating body or the second rotating body by causing rotary power to act on a path through which power is transmitted to the first rotating body or the second rotating body.

12. The spreading device according to claim 11, further comprising
- a divisional transmission unit to transmit power from the output shaft in such a manner that the power is divided between a first transmission component to the first power transmission unit and a second transmission component to the second power transmission unit.

* * * * *